US009436690B2

(12) United States Patent
Harris et al.

(10) Patent No.: US 9,436,690 B2
(45) Date of Patent: *Sep. 6, 2016

(54) SYSTEM AND METHOD FOR PREDICTING A GEOGRAPHIC ORIGIN OF CONTENT AND ACCURACY OF GEOTAGS RELATED TO CONTENT OBTAINED FROM SOCIAL MEDIA AND OTHER CONTENT PROVIDERS

(71) Applicant: Geofeedia, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: Geofeedia, Inc., Naples (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,293

(22) Filed: Oct. 10, 2014

(65) Prior Publication Data

US 2015/0032739 A1    Jan. 29, 2015

Related U.S. Application Data

(63) Continuation of application No. 13/843,949, filed on Mar. 15, 2013, now Pat. No. 8,862,589.

(51) Int. Cl.
*G06F 17/30* (2006.01)

(52) U.S. Cl.
CPC ..... *G06F 17/30041* (2013.01); *G06F 17/3087* (2013.01)

(58) Field of Classification Search
CPC .............. G06F 17/30241; G06F 17/3087
USPC ......................................... 707/724, 743, 748
See application file for complete search history.

(56) References Cited

U.S. PATENT DOCUMENTS

| 6,026,368 | A | 2/2000 | Brown |
| 6,363,320 | B1 | 3/2002 | Chou ........................... 701/207 |
| 6,591,266 | B1 | 7/2003 | Li et al. ........................ 707/10 |

(Continued)

FOREIGN PATENT DOCUMENTS

| EP | 1 045 345 | 10/2000 |
| EP | 2187594 A1 | 5/2010 |

(Continued)

OTHER PUBLICATIONS

U.S. Appl. No. 13/284,455, a non-final Office Action, mailed Jan. 7, 2013, 18 pages.

(Continued)

*Primary Examiner* — Joshua Bullock
(74) *Attorney, Agent, or Firm* — Sheppard Mullin Richter & Hampton LLP

(57) ABSTRACT

A system and method for managing geotag data associated with content within a geofeed is provided. The content may be tagged with metadata such as geotag data that may specify a location where the content was created. The generated content may be geotagged by one or more geotag sources including a GPS-enabled device, a user input, a content provider, a user profile, or other sources. The system may determine the geotag data for the content that is not already associated with geotag data. The system may determine a confidence level of the geotag data, whether already geotagged or not. The confidence level may be indicative of a likelihood that the geotag data accurately describes a location where the content was actually created.

17 Claims, 7 Drawing Sheets

(56) References Cited

U.S. PATENT DOCUMENTS

| | | | |
|---|---|---|---|
| 7,522,940 B2 | 4/2009 | Jendbro et al. | 455/566 |
| 7,680,796 B2 | 3/2010 | Yeh | |
| 7,698,336 B2 | 4/2010 | Nath | 707/737 |
| 7,912,451 B2 | 3/2011 | Eckhart | 455/410 |
| 7,974,983 B2 | 7/2011 | Goeldi | |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 8,484,224 B1 | 7/2013 | Harris et al. | 707/748 |
| 8,595,317 B1 | 11/2013 | Harris et al. | 709/213 |
| 8,612,533 B1 | 12/2013 | Harris et al. | 709/206 |
| 8,639,767 B1 | 1/2014 | Harris et al. | 709/207 |
| 8,655,873 B2 | 2/2014 | Mitchell et al. | 707/724 |
| 8,655,983 B1 | 2/2014 | Harris et al. | 709/217 |
| 8,812,951 B1 | 8/2014 | White | |
| 8,843,515 B2 | 9/2014 | Burris | 707/769 |
| 8,849,935 B1 | 9/2014 | Harris et al. | 709/206 |
| 8,850,531 B1 | 9/2014 | Harris et al. | 726/4 |
| 8,862,589 B2 | 10/2014 | Harris et al. | 707/743 |
| 8,990,346 B2 | 3/2015 | Harris et al. | 709/217 |
| 9,055,074 B2 | 6/2015 | Harris | |
| 9,077,675 B2 | 7/2015 | Harris | |
| 9,077,782 B2 | 7/2015 | Harris | |
| 9,258,373 B2 | 2/2016 | Harris | |
| 9,307,353 B2 | 4/2016 | Harris | |
| 9,317,600 B2 | 4/2016 | Harris | |
| 9,369,533 B2 | 6/2016 | Harris | |
| 2002/0029226 A1 | 3/2002 | Li et al. | 707/104.1 |
| 2002/0029384 A1 | 3/2002 | Griggs | |
| 2002/0116505 A1 | 8/2002 | Higgins et al. | 709/227 |
| 2002/0128908 A1 | 9/2002 | Levin | |
| 2002/0188669 A1 | 12/2002 | Levine | |
| 2003/0018607 A1 | 1/2003 | Lennon | |
| 2003/0025832 A1 | 2/2003 | Swart | |
| 2003/0040971 A1 | 2/2003 | Freedenberg | |
| 2003/0088609 A1 | 5/2003 | Guedalia et al. | 709/107 |
| 2004/0203854 A1 | 10/2004 | Nowak | 455/456.1 |
| 2004/0205585 A1 | 10/2004 | McConnell | |
| 2004/0225635 A1 | 11/2004 | Toyama et al. | 707/1 |
| 2005/0034074 A1* | 2/2005 | Munson et al. | 715/712 |
| 2006/0002317 A1 | 1/2006 | Punaganti Venkata | 370/310 |
| 2006/0106778 A1 | 5/2006 | Baldwin | |
| 2006/0184968 A1 | 8/2006 | Clayton et al. | 725/56 |
| 2006/0200305 A1 | 9/2006 | Sheha et al. | 701/200 |
| 2007/0043721 A1 | 2/2007 | Ghemawat et al. | 707/7 |
| 2007/0112729 A1 | 5/2007 | Wiseman et al. | 707/3 |
| 2007/0121843 A1 | 5/2007 | Atazky et al. | 379/114.13 |
| 2007/0143345 A1 | 6/2007 | Jones et al. | 707/104.1 |
| 2007/0210937 A1 | 9/2007 | Smith et al. | 340/995.1 |
| 2007/0276919 A1 | 11/2007 | Buchmann et al. | 709/217 |
| 2007/0294299 A1 | 12/2007 | Goldstein | |
| 2008/0092054 A1 | 4/2008 | Bhumkar et al. | 715/739 |
| 2008/0104019 A1 | 5/2008 | Nath | 707/3 |
| 2008/0125969 A1 | 5/2008 | Chen et al. | 701/211 |
| 2008/0147674 A1 | 6/2008 | Nandiwada | |
| 2008/0162540 A1 | 7/2008 | Parikh et al. | 707/102 |
| 2008/0189099 A1 | 8/2008 | Friedman | |
| 2008/0192934 A1 | 8/2008 | Nelger et al. | 380/258 |
| 2008/0250031 A1 | 10/2008 | Ting et al. | 707/100 |
| 2008/0294603 A1 | 11/2008 | Ranjan et al. | 707/3 |
| 2009/0005968 A1 | 1/2009 | Vengroff et al. | 701/202 |
| 2009/0102859 A1 | 4/2009 | Athsani et al. | 345/619 |
| 2009/0132435 A1 | 5/2009 | Titus et al. | 705/400 |
| 2009/0138497 A1 | 5/2009 | Zavoli et al. | 707/102 |
| 2009/0210426 A1 | 8/2009 | Kulakov | |
| 2009/0217232 A1 | 8/2009 | Beerel | |
| 2009/0222482 A1 | 9/2009 | Klassen | |
| 2009/0297118 A1 | 12/2009 | Fink | |
| 2009/0300528 A1 | 12/2009 | Stambaugh | 715/764 |
| 2009/0327232 A1 | 12/2009 | Carter et al. | 707/3 |
| 2010/0010907 A1 | 1/2010 | Dasgupta | |
| 2010/0030648 A1 | 2/2010 | Manolescu | |
| 2010/0076968 A1 | 3/2010 | Boyns et al. | 707/732 |
| 2010/0079338 A1 | 4/2010 | Wooden | |
| 2010/0083124 A1 | 4/2010 | Druzgalski | |
| 2010/0145947 A1 | 6/2010 | Kolman et al. | 707/736 |
| 2010/0149399 A1 | 6/2010 | Mukai et al. | 348/333.02 |
| 2010/0153386 A1 | 6/2010 | Tysowski | 707/736 |
| 2010/0153410 A1 | 6/2010 | Jin et al. | 707/758 |
| 2010/0174998 A1 | 7/2010 | Lazarus et al. | 715/751 |
| 2010/0177120 A1 | 7/2010 | Balfour | 345/647 |
| 2010/0180001 A1 | 7/2010 | Hardt | 709/207 |
| 2011/0007941 A1* | 1/2011 | Chen et al. | 382/103 |
| 2011/0010674 A1 | 1/2011 | Knize et al. | 715/849 |
| 2011/0035284 A1 | 2/2011 | Moshfeghi | 705/14.58 |
| 2011/0040894 A1 | 2/2011 | Shrum | |
| 2011/0055176 A1 | 3/2011 | Choi | |
| 2011/0072106 A1 | 3/2011 | Hoffert | |
| 2011/0072114 A1 | 3/2011 | Hoffert | |
| 2011/0078584 A1 | 3/2011 | Winterstein et al. | 715/751 |
| 2011/0083013 A1 | 4/2011 | Nice et al. | 713/168 |
| 2011/0113096 A1 | 5/2011 | Long et al. | 709/204 |
| 2011/0123066 A9* | 5/2011 | Chen et al. | 382/103 |
| 2011/0131496 A1 | 6/2011 | Abram et al. | 715/722 |
| 2011/0137561 A1 | 6/2011 | Kankainen | 701/300 |
| 2011/0142347 A1* | 6/2011 | Chen et al. | 382/190 |
| 2011/0153368 A1 | 6/2011 | Pierre et al. | 705/4 |
| 2011/0202544 A1 | 8/2011 | Carle et al. | 707/754 |
| 2011/0227699 A1 | 9/2011 | Seth et al. | 340/8.1 |
| 2011/0270940 A1 | 11/2011 | Johnson et al. | 709/207 |
| 2011/0288917 A1 | 11/2011 | Wanek et al. | 705/14.5 |
| 2011/0307307 A1 | 12/2011 | Benmbarek | |
| 2012/0001938 A1 | 1/2012 | Sandberg | 345/633 |
| 2012/0047219 A1 | 2/2012 | Feng et al. | 709/207 |
| 2012/0077521 A1 | 3/2012 | Boldyrev | |
| 2012/0078503 A1 | 3/2012 | Dzubay et al. | 701/410 |
| 2012/0084323 A1 | 4/2012 | Epshtein et al. | 707/776 |
| 2012/0101880 A1 | 4/2012 | Alexander | |
| 2012/0124161 A1 | 5/2012 | Tidwell | |
| 2012/0150901 A1 | 6/2012 | Johnson et al. | 707/769 |
| 2012/0158536 A1 | 6/2012 | Gratton | |
| 2012/0166367 A1 | 6/2012 | Murdock et al. | 706/12 |
| 2012/0212398 A1 | 8/2012 | Border et al. | 345/8 |
| 2012/0221687 A1 | 8/2012 | Hunter et al. | 709/219 |
| 2012/0232939 A1 | 9/2012 | Pierre et al. | 705/4 |
| 2012/0233158 A1 | 9/2012 | Braginsky | |
| 2012/0239763 A1 | 9/2012 | Musil | |
| 2012/0254251 A1 | 10/2012 | Patton | 715/758 |
| 2012/0259791 A1 | 10/2012 | Zoidze | 705/319 |
| 2012/0276848 A1* | 11/2012 | Krattiger et al. | 455/41.2 |
| 2012/0276918 A1* | 11/2012 | Krattiger et al. | 455/456.1 |
| 2012/0323687 A1 | 12/2012 | Schuster et al. | 705/14.57 |
| 2012/0330959 A1 | 12/2012 | Kretz et al. | 707/739 |
| 2013/0013713 A1 | 1/2013 | Shoham | 709/206 |
| 2013/0018957 A1 | 1/2013 | Parnaby et al. | 709/204 |
| 2013/0051611 A1 | 2/2013 | Hicks | 382/103 |
| 2013/0054672 A1 | 2/2013 | Stilling | |
| 2013/0060796 A1 | 3/2013 | Gilg | |
| 2013/0073388 A1 | 3/2013 | Heath | 705/14.53 |
| 2013/0073389 A1 | 3/2013 | Heath | |
| 2013/0073631 A1 | 3/2013 | Patton et al. | 709/204 |
| 2013/0110631 A1 | 5/2013 | Mitchell et al. | 705/14.58 |
| 2013/0110641 A1 | 5/2013 | Ormont | |
| 2013/0124437 A1 | 5/2013 | Pennacchiotti | |
| 2013/0131918 A1 | 5/2013 | Hahne | |
| 2013/0132194 A1 | 5/2013 | Rajaram | |
| 2013/0150015 A1 | 6/2013 | Valko et al. | 455/418 |
| 2013/0159463 A1 | 6/2013 | Bentley et al. | 709/217 |
| 2013/0201182 A1 | 8/2013 | Kuroki et al. | 345/419 |
| 2013/0238599 A1 | 9/2013 | Burris | 707/722 |
| 2013/0238652 A1 | 9/2013 | Burris | 707/769 |
| 2013/0238658 A1 | 9/2013 | Burris | 707/770 |
| 2013/0268558 A1 | 10/2013 | Burris | 707/770 |
| 2013/0346563 A1 | 12/2013 | Huang | 709/219 |
| 2014/0025911 A1 | 1/2014 | Sims | |
| 2014/0040371 A1 | 2/2014 | Gurevich | |
| 2014/0089296 A1 | 3/2014 | Burris | 707/722 |
| 2014/0089343 A1 | 3/2014 | Burris et al. | 707/770 |
| 2014/0089461 A1 | 3/2014 | Harris et al. | 709/217 |
| 2014/0095509 A1 | 4/2014 | Patton | 707/740 |
| 2014/0164368 A1 | 6/2014 | Mitchell et al. | 707/724 |
| 2014/0195918 A1 | 7/2014 | Friedlander | |
| 2014/0207893 A1 | 7/2014 | Harris et al. | 709/207 |
| 2014/0222950 A1* | 8/2014 | Rabel | 709/217 |

(56) References Cited

U.S. PATENT DOCUMENTS

| | | | |
|---|---|---|---|
| 2014/0236882 A1 | 8/2014 | Rishe | |
| 2014/0256355 A1 | 9/2014 | Harris et al. | 455/456.3 |
| 2014/0258451 A1 | 9/2014 | Harris et al. | 709/217 |
| 2014/0259113 A1 | 9/2014 | Harris et al. | 726/4 |
| 2014/0274148 A1 | 9/2014 | Harris et al. | 455/456.3 |
| 2014/0280103 A1 | 9/2014 | Harris et al. | 707/724 |
| 2014/0280278 A1 | 9/2014 | Harris et al. | 707/758 |
| 2014/0280569 A1 | 9/2014 | Harris et al. | 709/204 |
| 2014/0297740 A1 | 10/2014 | Narayanan | |
| 2015/0019648 A1 | 1/2015 | Harris et al. | 709/204 |
| 2015/0019866 A1 | 1/2015 | Braness | |
| 2015/0020208 A1 | 1/2015 | Harris et al. | 726/26 |
| 2015/0172396 A1 | 6/2015 | Longo | |
| 2015/0256632 A1 | 9/2015 | Harris | |
| 2015/0381380 A1 | 12/2015 | Harris | |
| 2016/0006783 A1 | 1/2016 | Harris | |
| 2016/0014219 A1 | 1/2016 | Harris | |
| 2016/0182656 A1 | 6/2016 | Harris | |

FOREIGN PATENT DOCUMENTS

| | | |
|---|---|---|
| EP | 2293566 A2 | 3/2011 |
| WO | WO 99/15995 | 4/1999 |
| WO | WO 2010/049918 | 5/2010 |
| WO | WO 2013/133870 | 9/2013 |
| WO | WO 2013/134451 | 9/2013 |

OTHER PUBLICATIONS

U.S. Appl. No. 13/619,888, a non-final Office Action, mailed Mar. 1, 2013, 15 pages.
U.S. Appl. No. 13/708,466, a non-final Office Action, mailed Apr. 17, 2013, 15 pages.
U.S. Appl. No. 13/708,516, a non-final Office Action, mailed May 15, 2013, 11 pages.
U.S. Appl. No. 13/708,404, a Notice of Allowance, mailed May 24, 2013, 12 pages.
U.S. Appl. No. 13/284,455, a non-final Office Action, mailed Jun. 4, 2013, 28 pages.
U.S. Appl. No. 13/708,516, a Notice of Allowance, mailed Jun. 7, 2013, 14 pages.
U.S. Appl. No. 13/619,888, a Notice of Allowance issued, mailed Jul. 9, 2013, 10 pages.
U.S. Appl. No. 13/788,760, a Notice of Allowance, mailed Jul. 26, 2013, 12 pages.
U.S. Appl. No. 13/788,843, a non-final Office Action, mailed Aug. 5, 2013, 17 pages.
U.S. Appl. No. 13/788,909, a non-final Office Action, mailed Aug. 12, 2013, 17 pages.
U.S. Appl. No. 13/843,949, a non-final Office Action, mailed Aug. 29, 2013, 12 pages.
U.S. Appl. No. 13/708,466, a Notice of Allowance, mailed Sep. 3, 2013, 11 pages.
U.S. Appl. No. 13/843,832, a non-final Office Action, mailed Sep. 13, 2013, 12 pages.
U.S. Appl. No. 13/284,455, a Notice of Allowance, mailed Oct. 4, 2013, 17 pages.
U.S. Appl. No. 13/788,843, a final Office Action, mailed Jan. 21, 2014, 25 pages.
U.S. Appl. No. 13/843,832, a Notice of Allowance, mailed Jan. 24, 2014, 6 pages.
U.S. Appl. No. 13/788,909, a Notice of Allowance, mailed Jan. 24, 2014, 12 pages.
U.S. Appl. No. 13/843,949, a Notice of Allowance, mailed Feb. 3, 2014, 11 pages.
U.S. Appl. No. 13/843,949, a Notice of Allowance, mailed May 9, 2014, 10 pages.
U.S. Appl. No. 13/843,832, a Notice of Allowance, mailed May 20, 2014, 7 pages.
U.S. Appl. No. 13/788,909, a Notice of Allowance, mailed Jun. 24, 2014, 11 pages.
U.S. Appl. No. 14/089,631, a non-final Office Action, mailed Jul. 8, 2014, 21 pages.
U.S. Appl. No. 14/180,473, a non-final Office Action, mailed Jul. 8, 2014, 18 pages.
Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.
Bao, Jie, et al., "GeoFeed: A Location-Aware News Feed System", IEEE Xplore® Digital Library, Published in *2012 IEEE 28th International Conference on Data Engineering*, Apr. 1-5, 2012, 14 pages.
Sarwat, Mohamed, et al., "Sindbad: A Location-Based Social Networking System", *SIGMOD '12*, Scottsdale, Arizona, May 20-24, 2012, 4 pages.
Amitay et al., "Web-a-Where: Geotagging Web Content", *Proceedings of the 27th Annual International ACM SIGIR Conference on Research and Development in Information Retrieval (SIGIR)*, 2004, pp. 273-280.
U.S. Appl. No. 14/215,612, a non-final Office Action, mailed Jul. 11, 2014, 16 pages.
U.S. Appl. No. 14/108,301, a non-final Office Action, mailed Sep. 11, 2014, 10 pages.
U.S. Appl. No. 14/164,362, a non-final Office Action, mailed Oct. 23, 2014, 15 pages.
U.S. Appl. No. 14/180,845, a non-final Office Action, mailed Oct. 23, 2014, 32 pages.
U.S. Appl. No. 14/215,612, a final Office Action, mailed Nov. 28, 2014, 31 pages.
U.S. Appl. No. 14/089,631, a final Office Action, mailed Jan. 2, 2015, 8 pages.
U.S. Appl. No. 14/180,473, a final Office Action, mailed Jan. 5, 2015, 7 pages.
U.S. Appl. No. 14/180,473, a Notice of Allowance, mailed Jan. 27, 2015, 8 pages.
U.S. Appl. No. 14/089,631, a Notice of Allowance, mailed Feb. 2, 2015, 10 pages.
U.S. Appl. No. 13/788,843, a non-final Office Action, mailed Feb. 20, 2015, 26 pages.
U.S. Appl. No. 14/108,301, a Notice of Allowance, mailed Feb. 20, 2015, 13 pages.
U.S. Appl. No. 14/164,362, a Notice of Allowance, mailed Feb. 24, 2015, 22 pages.
U.S. Appl. No. 14/180,845, a final Office Action, mailed Feb. 25, 2015, 32 pages.
Lee et al., "Tag-Geotag Correlation in Social Networks", *Proceedings of the 2008 ACM Workshop on Search in Social Media*, 2008, pp. 59-66.
U.S. Appl. No. 14/500,881, a non-final Office Action, mailed Sep. 21, 2015, 5 pages.
U.S. Appl. No. 14/180,845, a non-final Office Action, mailed Aug. 27, 2015, 43 pages.
U.S. Appl. No. 14/215,612, a non-final Office Action, mailed Aug. 18, 2015, 27 pages.
U.S. Appl. No. 14/500,832, a non-final Office Action, mailed May 21, 2015, 13 pages.
U.S. Appl. No. 14/666,056, a non-final Office Action, mailed Aug. 10, 2015, 17 pages.
U.S. Appl. No. 13/788,843, a Notice of Allowance, mailed Dec. 3, 2015, 18 pages.
U.S. Appl. No. 14/500,881, a non-final Office Action, mailed Dec. 21, 2015, 24 pages.
U.S. Appl. No. 14/666,056, a Final Office Action, mailed Jan. 4, 2016, 11 pages.
U.S. Appl. No. 14/813,031, a non-final Office Action, mailed Nov. 24, 2015, 23 pages.
U.S. Appl. No. 14/813,039, a non-final Office Action, mailed Jan. 20, 2016, 20 pages.
U.S. Appl. No. 14/180,845, a final Office Action, mailed Feb. 22, 2016, 43 pages.
U.S. Appl. No. 14/733,715, a non-final Office Action, mailed Mar. 11, 2016, 25 pages.

(56) References Cited

OTHER PUBLICATIONS

U.S. Appl. No. 14/792,538, a non-final Office Action, mailed Feb. 26, 2016, 20 pages.

U.S. Appl. No. 14/813,031, a final Office Action, mailed Mar. 21, 2016, 41 pages.

U.S. Appl. No. 14/813,039, a Final Office Action, mailed May 16, 2016, 14 pages.

U.S. Appl. No. 14/180,845, a non-final Office Action, mailed Jul. 7, 2016, 51 pages.

U.S. Appl. No. 15/018,767, a non-final Office Action, mailed Jun. 6, 2016, 19 pages.

\* cited by examiner

SYSTEM AND METHOD FOR PREDICTING A GEOGRAPHIC ORIGIN OF CONTENT AND ACCURACY OF GEOTAGS RELATED TO CONTENT OBTAINED FROM SOCIAL MEDIA AND OTHER CONTENT PROVIDERS

CROSS-REFERENCE TO RELATED APPLICATIONS

This application is a continuation U.S. patent application Ser. No. 13/843,949, filed Mar. 15, 2013, which is hereby incorporated by reference in its entirety.

FIELD OF THE INVENTION

The disclosure relates to systems and methods for predicting where content was created when the content lacks geotag data and predicting the accuracy of geotag data when the content includes geotag data, where the content is obtained from social media and other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively organized and/or selectively displayed.

Geotag data (also referred to as a "geotag"), which includes geographic information that indicates where content was created, may provide a basis for such organization. Some geotag data may be automatically generated and associated with the content (e.g., a camera may create photographs that are automatically geotagged with location information) while others may be added after the content is created. Such geotag information may be used to search for and obtain content that was created from particular locations.

However, although geotags may be useful in organizing the large amount of content from social networks and other content providers, much of the social media and other content are not geotagged, either because users have privacy concerns related to geotagging or they are simply not aware of geotagging capabilities. In either case, content that otherwise could be geotagged oftentimes is not.

When content is not geotagged, some content providers may provide geotags based a location specified in a user profile (hereinafter, "profile location") of a given user. This approach infers that content created by the given user was created at the profile location. However, this is inaccurate in many instances, as the user may create content at locations other than the profile location. Thus, even when content is geotagged, there may be some doubt as to the accuracy of the geographic information indicated by a corresponding geotag.

SUMMARY OF THE INVENTION

The disclosure relates to systems and methods for predicting where content was created when the content lacks geotag data and predicting the accuracy of geotag data when the content includes geotag data, where the content is obtained from social media and other content providers.

In some embodiments, the system may include a computer that facilitates managing geotag data associated with content within a geofeed. The computer may include one or more processors configured to perform some or all of a functionality of a plurality of modules. For example, the one or more processors may be configured to execute a geofeed creation module, a profile-based geo-searching module, a location prediction module, a location accuracy determination module, a communication module, a user interface module, and/or other modules.

The geofeed creation module may be configured to receive a request to create a geofeed based on a specification of one or more geo-locations (hereinafter, a "geo-location specification") and/or retrieve a previously requested geofeed (hereinafter, "geofeed request"). The request may include one or more geofeed parameters such as, for example, content providers to include (or exclude), types of content to include (or exclude), date ranges, content matching patterns, keywords, and/or other parameters that instruct the system as to which content should be included in the geofeed. As such, the one or more geofeed parameters may be used to filter content into the geofeed and/or out of the geofeed.

The geofeed creation module may generate a geofeed definition that includes the specification of the one or more geo-locations, the one or more geofeed parameters, and/or other information related to the geofeed. The geofeed definition may be updated.

To create the geofeed, the geofeed creation module may obtain the geo-location specification from the geofeed definition and generate requests that specify the one or more geo-locations specifically for individual ones of a plurality of content providers.

The profile-based geo-searching module may be configured to use a profile location of a user who created particular content to estimate the location of the content. For example, profile-based geo-searching module may obtain a profile location of a particular user from a content provider and determine that content that is created by the particular user was created at the profile location. In this manner, content items that are not geotagged (also referred to as "non-geotagged content") may still be found to satisfy a geo-location specification of a geofeed definition based on the profile location associated with the non-geotagged content.

In some embodiments, non-geotagged content may be obtained from content providers, such as when a geofeed definition does not specify a geo-location. In these instances, the location prediction module may be configured to predict where content was created. In other words, the location prediction module may determine geotag data for non-geotagged content.

In some embodiments, the location prediction module may predict where content was created using one or more techniques or combination of techniques. For example, the location prediction module may perform recognition techniques such as text recognition, image recognition, speech recognition, context-based recognition (e.g., recognizing buildings, signage, other indication of a particular landmark or place, and/or other geographical features in non-geotagged content and/or its associated metadata), and/or other recognition techniques that can be used to recognize location-identifying features within or related to the non-geotagged content.

In some embodiments, the location prediction module may be configured to automatically crawl hyperlinks included in the content, automatically correlate non-geotagged content and geo-tagged content (e.g., determining a correlation between non-geotagged content and geotagged content and/or tagging the non-geotagged content with geotag data associated with the geotagged content), and/or make other automatic determinations to predict where non-geotagged content was created.

The location accuracy determination module may be configured to predict, estimate, and/or otherwise determine the accuracy of a geotag assigned to and/or associated with content. For example, location accuracy determination module may calculate or otherwise determine a geotag confidence level that indicates a likelihood (which may be expressed as a probability) that the geotag accurately indicates a location from which the content was created. The geotag confidence level may also be indicative of the likelihood that the content associated with the particular geotag was actually created within the geo-location specified in the geofeed request.

In some embodiments, the location accuracy determination module may calculate or otherwise determine the confidence level based on a source from which the geotag information originated ("geotag sources"). Geotag sources may include, for example, a GPS-enabled device, different types of location sensors used, a user input, a content provider, a user profile, the location prediction module, and/or other sources of location information. Some geotag sources may be deemed more trustworthy than others. Thus, the location accuracy determination module may assign a higher or lower confidence levels to geotags depending on its geotag source. For example, a first geotag that is based on a GPS-enabled device may be deemed to be more accurate than a second geotag that is based on the location profile. As such, the location accuracy determination module may assign a higher confidence level for the first geotag than for the second geotag.

Location accuracy determination module may use a combination of geotag sources to determine the confidence level as well. For example, if both the first geotag and the second geotag in the foregoing example indicate the same or similar location for a given content, then the confidence level for a location prediction for the content item may be higher than if only one was available or they do not match with one another.

The communication module may be configured to communicate the geofeed comprising the content that is associated with geotags obtained from one or more geotag sources. The geofeed may be communicated to the content consumer via the user interface communicated via the user interface module and/or other communication channel.

The user interface module may be configured to generate a user interface that displays the content within a geofeed along with a confidence level indicating the accuracy of the geotag associated with the content and/or a corresponding geotag source. In some embodiments, the user interface module may display a scrollbar, a text input box, and/or other input fields that can receive a user input for a threshold confidence level. A user may via an input field indicate a threshold confidence level and the user interface module may highlight or otherwise differentially display content with a confidence level that is higher than the threshold value from content with a confidence level that is lower than the threshold value.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
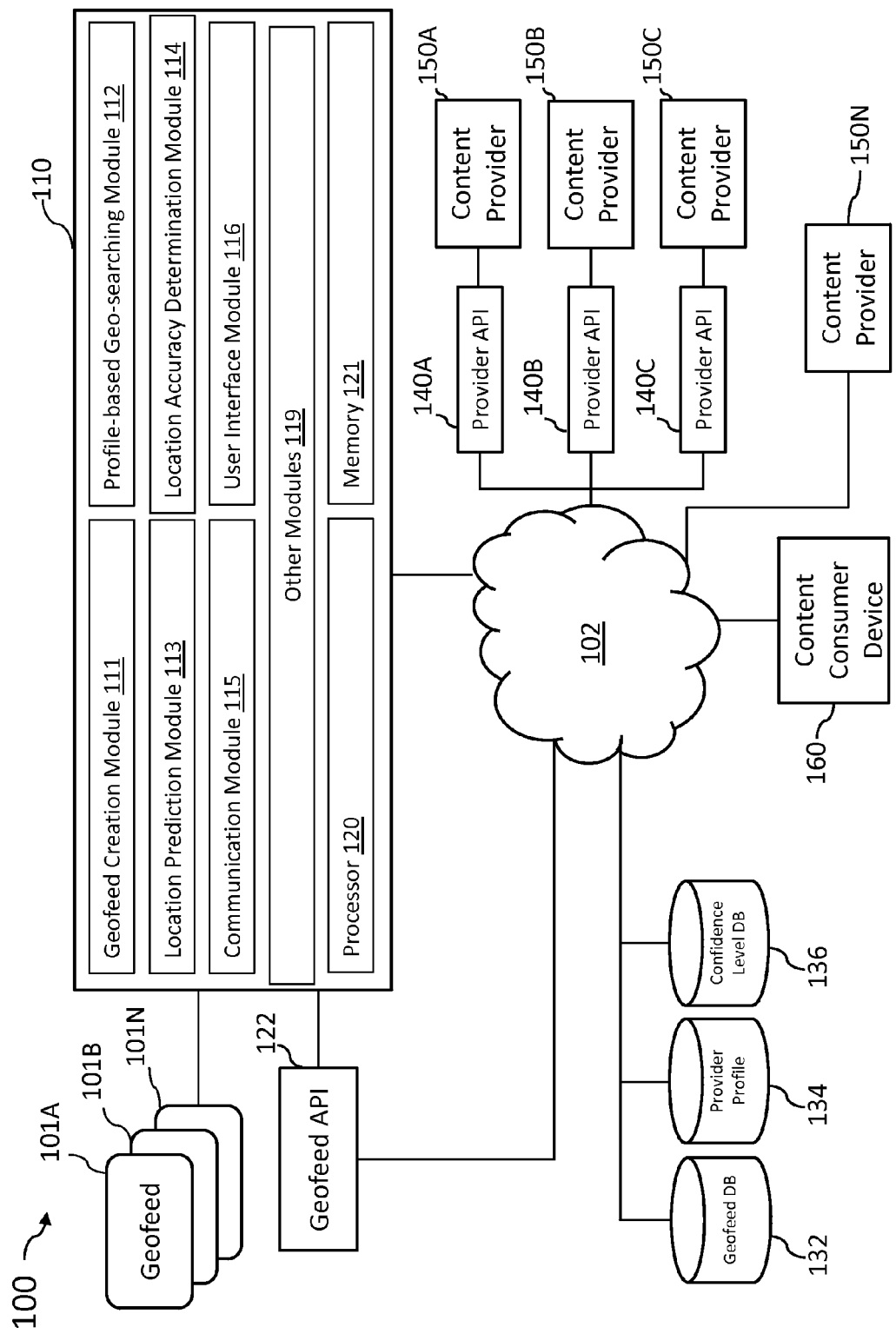
FIG. 1 illustrates a system of managing geotag data associated with content within a geofeed, according to an aspect of the invention.

FIG. 1 illustrates a system 100 of managing geotag data associated with content in a geofeed, according to an aspect of the invention. A geofeed includes a collection of content, aggregated from various content providers, that is relevant to a geographically definable location (hereinafter, a "geo-location"). The aggregated content (also referred to herein as "geofeed content") may include, for example, video, audio, images, text, hyperlinks, and/or other content that may be relevant to a geo-location.

The content providers may include, for example, social media platforms (e.g., FACEBOOK, TWITTER, INSTAGRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. Social media platforms may, for example, register users so that the users may post content, which is distributed by the social media platform to other users. The content may be generated by content sources such as individuals, corporations, and/or other entities that may create content. As used hereinafter, "a location," "a geo-location," "a geographically definable location," and similar language is not limited to a single location but may also refer to one or more such locations.

System 100 may include a computer 110, a geofeed API 122, a content consumer device 160, provider APIs 140, content providers 150, and/or other components. In some implementations, computer 110 may include one or more processors 120 configured to perform some or all of a functionality of a plurality of modules, which may be stored in a memory 121. For example, the one or more processors may be configured to execute a geofeed creation module 111, a profile-based geo-searching module 112, a location prediction module 113, a location accuracy determination module 114, a communication module 115, a user interface module 116, and/or other modules 119.

Geofeed creation module 111 may be configured to create one or more geofeeds 101 (illustrated in FIG. 1 as geofeed 101A, 101B, . . . , 101N), as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entirety.

Co-pending U.S. patent application Ser. No. 13/708,516, filed Dec. 7, 2012, entitled "SYSTEM AND METHOD FOR LOCATION MONITORING BASED ON ORGANIZED GEOFEEDS," co-pending U.S. patent application Ser. No. 13/708,466, filed Dec. 7, 2012, entitled "SYSTEM AND METHOD FOR GENERATING AND MANAGING GEO-FEED-BASED ALERTS," co-pending U.S. patent application Ser. No. 13/708,404, filed Dec. 7, 2012, entitled "SYSTEM AND METHOD FOR RANKING GEOFEEDS AND CONTENT WITHIN GEOFEEDS," co-pending U.S. patent application Ser. No. 13/788,843, filed Mar. 7, 2013, entitled "SYSTEM AND METHOD FOR DIFFERENTIALLY PROCESSING A LOCATION INPUT FOR CONTENT PROVIDERS THAT USE DIFFERENT LOCATION INPUT FORMATS," U.S. patent application Ser. No. 13/788,760, filed Mar. 7, 2013, entitled "SYSTEM AND METHOD FOR CREATING AND MANAGING GEO-FEEDS," and U.S. patent application Ser. No. 13/788,909, filed Mar. 7, 2013, entitled "SYSTEM AND METHOD FOR TARGETED MESSAGING, WORKFLOW MANAGEMENT, AND DIGITAL RIGHTS MANAGEMENT FOR GEOFEEDS," are all incorporated by reference in their entireties herein. are all incorporated by reference in their entireties herein.

Co-pending patent application, filed concurrently herewith, entitled "SYSTEM AND METHOD FOR GENERATING THREE-DIMENSIONAL GEOFEEDS, ORIENTATION-BASED GEOFEEDS, AND GEOFEEDS BASED ON AMBIENT CONDITIONS," Ser. No. 13/843,832 and co-pending patent application, filed concurrently herewith, entitled "VIEW OF A PHYSICAL SPACE AUGMENTED WITH SOCIAL MEDIA CONTENT ORIGINATING FROM A GEO-LOCATION OF THE PHYSICAL SPACE," 61/800,951 are all incorporated by reference in their entireties herein. are all incorporated by reference in their entireties herein.

For example, geofeed creation module 111 may be configured to receive a request to create a geofeed and/or retrieve a previously requested geofeed (hereinafter, "geofeed request"). The request may include a specification of one or more geo-locations (hereinafter, a "geo-location specification") and one or more geofeed parameters such as, for example, providers to include (or exclude), types of content to include (or exclude), date ranges, content matching patterns, keywords, and/or other parameters that instruct the system as to which content should be included in the geofeed.

Geofeed creation module 111 may format a geofeed request specific for different provider APIs 140 (illustrated in FIG. 1 as API 140A, 140B, . . . , 140N). The provider APIs may facilitate receiving content from corresponding content providers 150 (illustrated in FIG. 1 as content providers 150A, 150B, 150C). In some implementations, geofeed creation module 111 may format a request directly for content provider 150N without using a corresponding API. Formatting instructions may be stored at a provider profile 134. A content consumer device 160 may request and view geofeeds 101 created by geofeed creation module 111.

Content provided by content providers 150 in response to a geofeed request may already have geotag data embedded in the content. For example, the content may have been automatically geotagged (e.g., by a GPS-enabled device), geotagged based on a user input (e.g., the content creator manually inputting a geo-location when creating a social media post), geotagged by a content provider (e.g., the content provider creating geotag data using various techniques as apparent to those of ordinary skill in the art), geotagged using a location specified in a user profile (hereinafter, "profile location") of the content creator who created the particular content, and/or geotagged with other types of geotag data (hereinafter, "geotagged content").

A user profile of a content creator often contains geographic location information such as a "home" location of the content creator since many content providers require content creators (e.g., social media users) to indicate their "home" locations in their profiles when they initially sign up for social media services. As such, in some embodiments, a particular content provider may use a profile location associated with the content creator to define a location of where the content was created and/or geotag the content with the profile location.

In other embodiments, when a content consumer requests content from a content provider which does not generate, obtain, and/or manage geotags based on content creators' profile locations, profile-based geo-searching module 112 may be configured to identify a profile location associated with the content and/or use the profile location to determine whether the content is related to one or more geo-locations specified in the geofeed request. This capability to search for content based on the profile location may be enabled or disabled. When it is enabled, profile-based geo-searching module 112 may identify a profile location associated with content by accessing the user profile of the content creator who created the particular content and/or create a geotag for the content using the profile location. For example, when it is determined that the content is not being associated with any geotags (e.g., the content was not automatically geotagged by a GPS-enabled device and/or geotagged based on a user input), profile-based geo-searching module 112 may identify a profile location and compare it with the one or more geo-locations specified in the geofeed request to determine whether the content is related to the one or more geo-locations.

In some embodiments, content provided by content providers 150 in response to a geofeed request may include content that is not already associated with a geotag when the content is acquired by geofeed creation module 111 (hereinafter, "non-geotagged content"). For example, non-geotagged content may be deemed responsive to the geofeed request when other tags/metadata (e.g., keywords, creation time/date, etc.) associated with the non-geotagged content match the criteria defined by one or more geofeed parameters (e.g., keywords, date ranges, etc.) of the geofeed request.

Location prediction module 113 may be configured to determine geotag data for non-geotagged content that is not already associated with a geotag when the content is acquired by geofeed creation module 111 and/or to link the determined geotag data to the content. Location prediction module 113 may determine the geotag data that would most accurately describes a location where the content was created using various geotag recognition techniques including text, image, or speech recognition, context-based recognition, automated crawling of hyperlinks, automated correlation between non-geotagged content and geo-tagged content, or any combination thereof.

In some embodiments, location prediction module 113 may determine geotag data by recognizing buildings, signage, other indication of a particular landmark or place, and/or other geographical features in the non-geotagged content. For example, non-geotagged content may comprise a status update (e.g. FACEBOOK "status update") referring to the Empire State Building: "I am at the Empire State Building." Location prediction module 113 may recognize the word "the Empire State Building" as an indication of geo-location and/or retrieve a geo-location (e.g., geographic coordinates) that corresponds to the known location of the Empire State Building. In another example, non-geotagged content may comprise a photograph that shows the White House. Location prediction module 113 may utilize an image recognition technique to recognize that the photograph includes an image of the White House and the photograph may be geotagged with the geographic coordinates of the White House.

In some embodiments, the non-geotagged content may be automatically tagged with geotag data by analyzing hyperlinks included in the content. For example, the non-geotagged content may include a hyperlink that links and/or points to geotagged content. A geotag may be retrieved from the geotagged content and/or automatically applied to the non-geotagged content or it may be configured to be applied only if certain conditions have been satisfied. For instance, whether the non-geotagged content should adopt the geotag may be determined based on a temporal proximity of the creation date/time of the geotagged content to the creation date/time of the non-geotagged content. Such a condition may be necessary to ensure that the geotag data that is applied to the non-geotagged content accurately describes the location where the non-geotagged content was created. For example, a content creator may create a social media post that includes a hyperlink that links and/or points to a geotagged image of the place where he/she is at (e.g., "I am here right now, http:// . . . ") soon after the image was created. In this case, there is a higher chance that the geotag data associated with the image accurately describes the location where the social media post was created. On the other hand, the content creator may create a social media post about the geotagged image after a predefined time has elapsed since the image was created (e.g., "I was here yesterday, http:// . . . "). If a predefined time has elapsed since the geotagged image was created, the geotag data associated with the image may no longer be relevant to the location where a subsequent post about the image is eventually created.

Content may contain any number of other types of metadata (e.g., tags) other than a geotag such as a title, comment, description, identification of a content creator, creation/modification date/time, content type, etc. In some embodiments, location prediction module 113 may search through such metadata associated with non-geotagged content to identify metadata that may provide an indication of geolocation. For example, non-geotagged content may comprise a photograph that may be titled "the Empire State Building," in which case location prediction module 113 may tag the content with the geo-location associated with the Empire State Building. In other embodiments, location prediction module 113 may utilize metadata associated with other content that the non-geotagged content has a relationship with. For example, the non-geotagged content and the other content may have a hierarchical relationship with each other. A photograph may belong to a photo album that is titled "Red Sox game." Location prediction module 113 may recognize this title of the photo album as an indication of geo-location (e.g., the Fenway Park, Boston, Mass.) and tag the photograph within the album with that geo-location.

In some embodiments, geographic location information of a place/location may be obtained and/or retrieved from an external database and/or other database storage that may store and/or maintain geographic information related to popular landmarks, places, etc.

In some embodiments, location prediction module 113 may be configured to make an automatic correlation between non-geotagged content and geotagged content. The geotagged content may include geotagged content that was obtained by geofeed creation module 111 in response to the current geofeed request, geotagged content that was previously obtained by geofeed creation module 111 based on past geofeed requests, content in which geotag data have been embedded by location prediction module 112, and/or any other geotagged content. Previously obtained geotagged content may be retrieved from a geofeed database 132, for example. Once a correlation is identified between the non-geotagged content and geotagged content, location prediction module 113 may tag the non-geotagged content with a geotag associated with the geotagged content.

In some embodiments, location prediction module 113 may also identify a correlation between non-geotagged content and geotagged content based on similarity in content and/or similarity between metadata (e.g., creation/modification date/time, identification of a content creator, etc.) associated with the non-geotagged content and metadata associated with the geotagged content. In one example, if the non-geotagged image contains an indication of geo-location (e.g., building, signage, etc.) that is similar to the image data of geotagged content, location prediction module 113 may determine that a correlation exists between them and/or tag the non-geotagged content with a geotag included in the geotagged content. In another example, location prediction module 113 may correlate non-geotagged content with geotagged content at least in part on the basis of similarity between metadata associated with the non-geotagged content and metadata associated with the geotagged content. For example, if the same content creator created both the non-geotagged content and the geotagged content around the same time (e.g., the content creator created the non-geotagged content within few minutes before/after the creation time of the geotagged content), location prediction module 113 may determine that a correlation exists between them and/or tag the non-geotagged content with a geotag included in the geotagged content.

Location accuracy determination module 114 may be configured to predict, estimate, and/or otherwise determine the accuracy of a geotag assigned and/or associated with content by calculating or otherwise determining a confidence level of location information defined in the geotag ("geotag confidence level"). For example, the geotag confidence level may indicate a likelihood (and/or probability) that the geotag accurately describes and/or matches a location from which the content was created. This confidence level may also be indicative of likelihood that the content associated with the particular geotag was actually created within the geo-location specified in the geofeed request.

In some embodiments, location accuracy determination module 114 may calculate or otherwise determine the confidence level by identifying a source from which the geotag originated ("geotag sources"). Geotag sources may include, for example, a GPS-enabled device (e.g., smartphone), a user input (e.g., the content creator manually inputting a geo-location when creating a social media post), a content provider (e.g., the content provider creating geotag data using various techniques as apparent to those of ordinary skill in the art), a user profile (e.g., the "home" location of the content creator), and/or location prediction module 113 (e.g., geotagged by crawling hyperlinks within content, automatic correlation, and/or other ways as discussed herein with respect to location prediction module 113). For example, geotags provided by geotag sources such as a GPS-enabled device and/or user input may be more likely to be accurate than the ones provided by a user profile and/or location prediction module 113, and thus may be assigned a higher confidence level.

In some embodiments, depending on the type of geotag source, a geotag confidence level may have a different predetermined and/or predefined confidence level value. For example, a geotag provided by a GPS-enabled device may be assigned a predetermined confidence level (e.g., 95%) that may be different from a predetermined confidence level (e.g., 75%) that may be assigned to a geotag provided by a user profile.

In some embodiment, for a profile-based geofeed result (e.g., having content associated with a profile location that is within a geo-location specified in a geofeed request), location accuracy determination module 114 may be configured to determine a geotag confidence level for the profile-based geofeed result based on a statistical analysis on a large quantity of geotagged content that has been geotagged by a geotag source other than a user profile ("non-profile-based geotagged content") (e.g., content that is geotagged with geographical coordinates) where the non-profile-based geotagged content was created within a geo-location specified in a geofeed request. In doing so, location accuracy determination module 114 may obtain from content providers a large quantity of non-profile-based geotagged content that are located within the specified geo-location from which the profile-based geofeed result also originated. Location accuracy determination module 114 may identify and/or obtain a profile location associated with individual non-profile-based geotagged content based on the user profile of the content creator who created the particular content. This profile location may be compared to the geographical coordinates (or other geo-location information) defined in the geotag of the individual non-profile-based geotagged content to determine whether the profile location matches with and/or correspond to the geotag data. A geotag location and a profile location may match and/or correspond to each other when they are directed to a location that is common to each other (e.g., two locations having an overlapping area).

In some embodiments, location accuracy determination module 114 may calculate, based on the comparison, a percentage of non-profile-based geotagged content whose geotag location match with and/or correspond to its profile location in a total quantity of non-profile-based geotagged content obtained by location accuracy determination module 114. This percentage value may indicate a confidence level that the profile-based geofeed result actually originated from the specified geo-location. In other words, it may indicate a degree of likelihood that the profile location associated with the profile-based geofeed result accurately corresponds to the location where the content related to the profile-based geofeed result was actually created.

In some embodiments, in calculating this percentage value, location accuracy determination module 114 may count the number of non-profile-based geotagged content whose geotag location (e.g., geographical coordinates) match with and/or correspond to its profile location and divide this counted number by the total number of non-profile-based geotagged content obtained by location accuracy determination module 114. As such, the higher this counted number is, the higher the confidence level determined for the profile-based geofeed result will be.

Communication module 115 may be configured to communicate the geofeed comprising the content that is associated with geotags obtained from one or more geotag sources. The geofeed may be communicated to the content consumer via the user interface communicated via user interface module 116 and/or other communication channel.

User interface module 116 may be configured to generate a user interface that displays the content within a geofeed along with a confidence level indicating the accuracy of the geotag associated with the content and/or a corresponding geotag source. In some embodiments, user interface module 116 may display a scrollbar, a text input box, and/or other input fields that can receive a user input for a threshold confidence level. A user may via an input field indicate a threshold confidence level and user interface module 116 may highlight or otherwise differentially display content with a confidence level that is higher than the threshold value from content with a confidence level that is lower than the threshold value.

Figure 5:
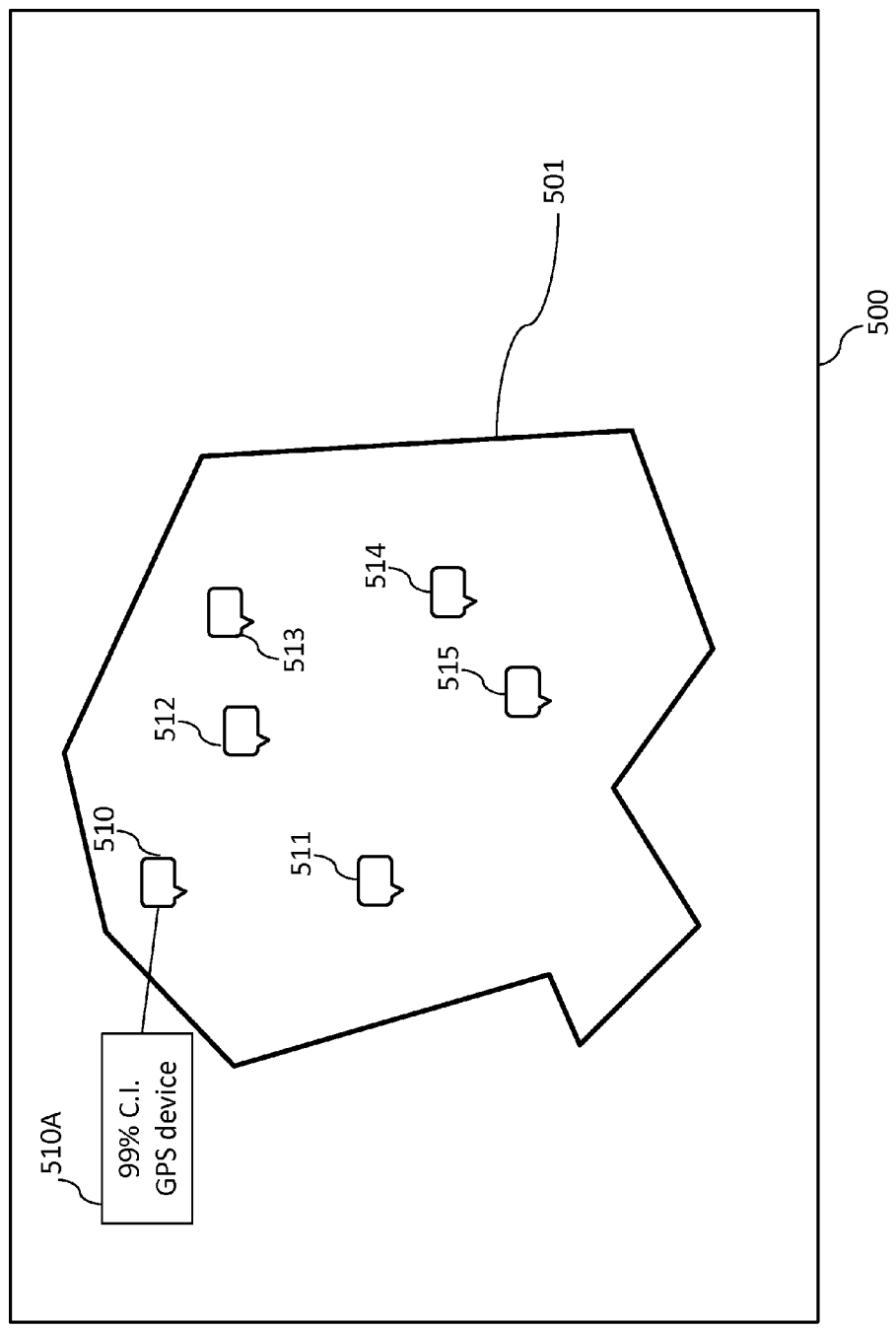
FIG. 5 illustrates a screenshot of an interface for communicating a geofeed comprising content associated with geotag data obtained from one or more geotag sources, according to an aspect of the invention, according to an aspect of the invention.
Figure 6:
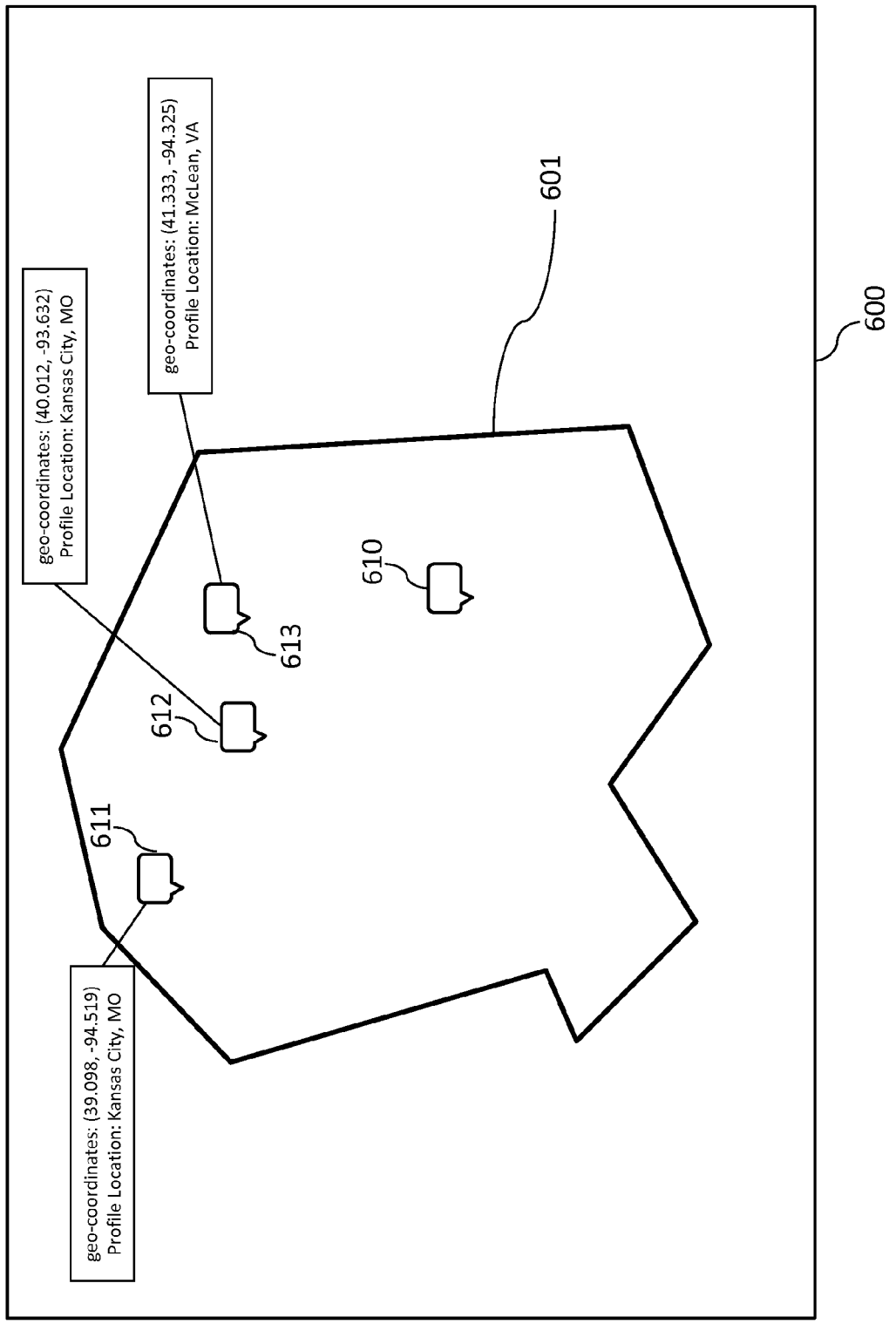
FIG. 6 illustrates a screenshot of an interface for communicating a geofeed comprising content associated with geotag data that is obtained based on a user profile of a content creator who created the content, according to an aspect of the invention.
Figure 7:
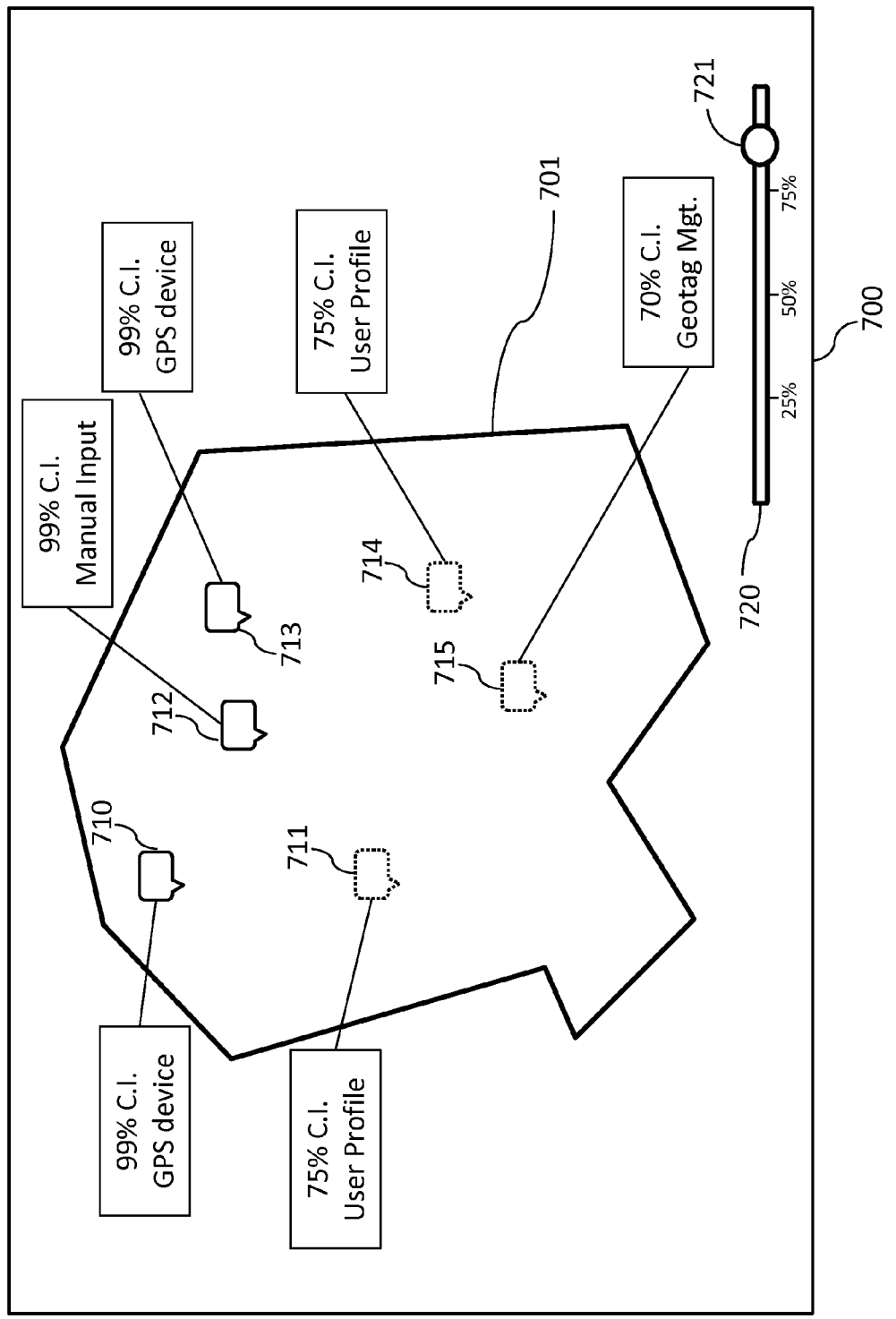
FIG. 7 illustrates a screenshot of an interface for communicating content within a geofeed based on geotag data confidence level selected by a user, according to an aspect of the invention.

Exemplary screenshots of interfaces generated by user interface module 116 are illustrated in FIGS. 5-7.

Those having skill in the art will recognize that computer 110 and content consumer device 160 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 160. In one implementation, computer 110 and consumer device 160 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
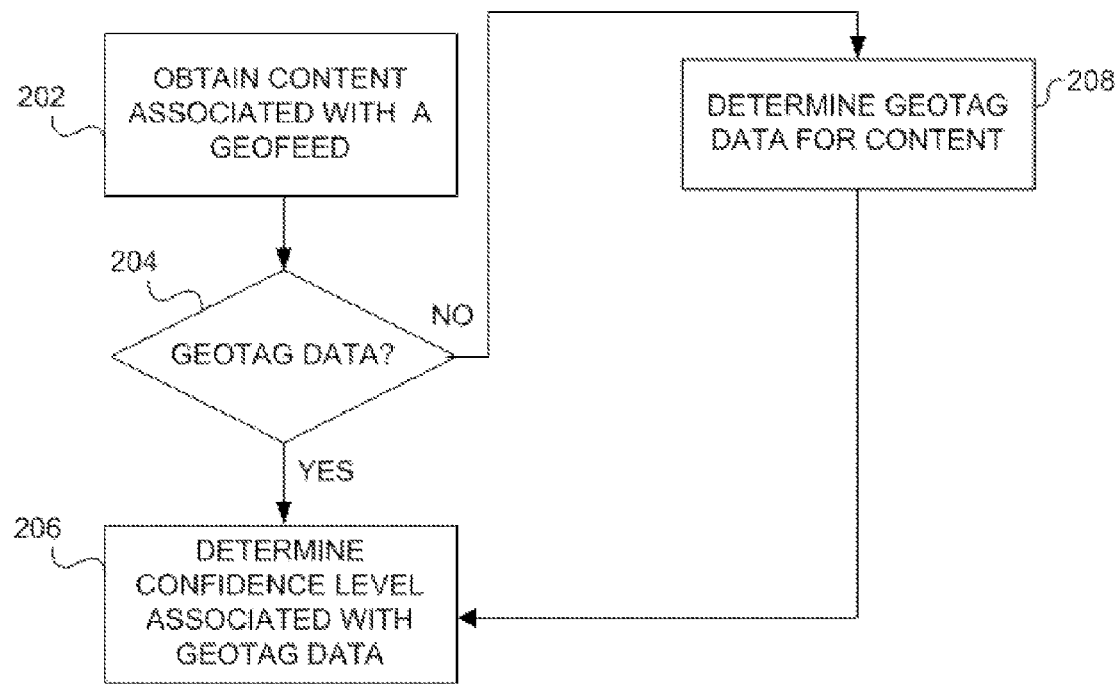
FIG. 2 illustrates a process for managing geotag data associated with content within a geofeed and determining a geotag confidence level associated with the geotag data, according to an aspect of the invention.

FIG. 2 illustrates a process 200 for managing geotag data associated with content within a geofeed and determining a geotag confidence level associated with the geotag data, according to an aspect of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include obtaining content associated with a geofeed. The geofeed may be created and/or retrieved by computer 110.

In an operation 204, process 200 may include determining whether metadata associated with the obtained content includes geotag data. If process 200 determines that the metadata associated with the content includes geotag data, process 200 may include determining a geotag confidence level associated with the geotag data in an operation 206. On the other hand, if the metadata associated with the content does not include geotag data, process 200 may include determining geotag data for the content in an operation 208.

In operation 208, process 200 may include determining the geotag data to be associated with the content in response to determining that the metadata associated with the content does not include the geotag data. Process 200 may determine the geotag data that would most accurately describes a location where the content was created using various geotag recognition techniques including text, image, or speech recognition, context-based recognition, automated crawling of hyperlinks, automated correlation between non-geotagged content and geo-tagged content, or any combination thereof. For example, process 200 may identify a hyperlink in the content where the hyperlink points and/or links to other geotagged content whose metadata includes geotag data. Process 200 may retrieve the geotag data from the geotagged content and/or apply to the content.

In operation 206, process 200 may include determining a geotag confidence level associated with the geotag data where the geotag data may have been already embedded in the content obtained in operation 202 or determined using one or more geotag recognition techniques in operation 208. Process 200 may include predicting, estimating, and/or otherwise determining the accuracy of geotag data assigned and/or associated with content by calculating or otherwise determining a confidence level of location information defined in the geotag data ("geotag confidence level"). For example, the geotag confidence level may indicate a likelihood (and/or probability) that the geotag data accurately describes and/or matches a location from which the content was created. This confidence level may also be indicative of likelihood that the content associated with the particular geotag was actually created within the geo-location specified in the geofeed request.

Figure 3:
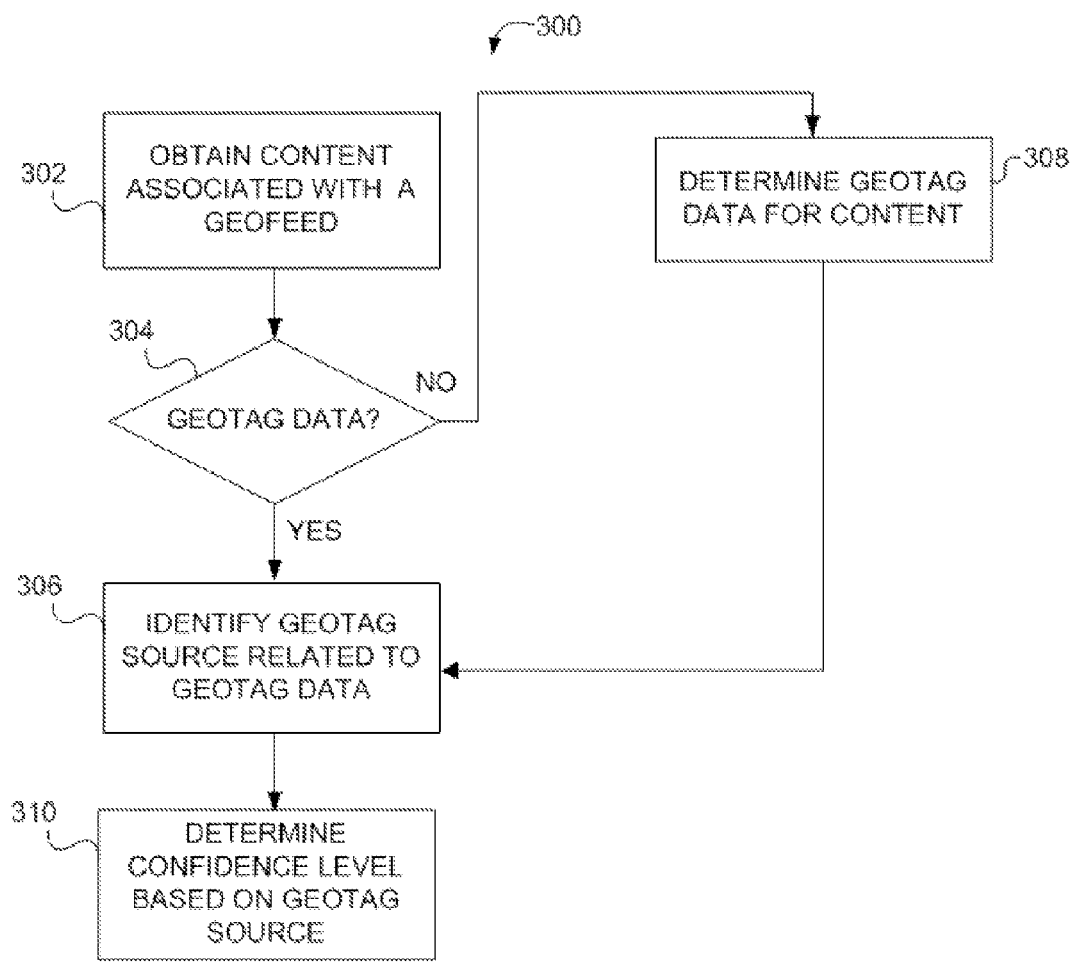
FIG. 3 illustrates a process for managing geotag data associated with content within a geofeed and determining a geotag confidence level associated with the geotag data based on a geotag source related to the geotag data, according to an aspect of the invention.

FIG. 3 illustrates a process 300 for managing geotag data associated with content within a geofeed and determining a geotag confidence level associated with the geotag data based on a geotag source related to the geotag data, according to an aspect of the invention.

In an operation 302, process 300 may include obtaining content associated with a geofeed. The geofeed may be created and/or retrieved by computer 110.

In an operation 304, process 300 may include determining whether metadata associated with the obtained content includes geotag data. If process 300 determines that the metadata associated with the content includes geotag data, process 300 may include identifying a geotag source related to the geotag data in an operation 306. On the other hand, if the metadata associated with the content does not include geotag data, process 300 may include determining geotag data for the content in an operation 308.

In operation 308, process 300 may include determining the geotag data to be associated with the content in response to determining that the metadata associated with the content does not include the geotag data. Process 300 may determine the geotag data that would most accurately describes a location where the content was created using various geotag recognition techniques including text, image, or speech recognition, context-based recognition, automated crawling of hyperlinks, automated correlation between non-geotagged content and geo-tagged content, or any combination thereof. For example, process 300 may identify a hyperlink in the content where the hyperlink points and/or links to other geotagged content whose metadata includes geotag data. Process 300 may retrieve the geotag data from the geotagged content and/or apply to the content.

In operation 306, process 300 may include identifying a source from which the geotag data originated ("geotag sources"). Geotag sources may include, for example, a GPS-enabled device (e.g., smartphone), a user input (e.g., the content creator manually inputting a geo-location when creating a social media post), a content provider (e.g., the content provider creating geotag data using various techniques as apparent to those of ordinary skill in the art), a user profile (e.g., the "home" location of the content creator), and/or location prediction module 113 (e.g., geotagged by crawling hyperlinks within content, automatic correlation, and/or other ways as discussed herein with respect to location prediction module 113). For example, the geotag data determined in operation 308 may be associated with a geotag source such as location prediction module 113 whereas the geotag data already embedded in the content obtained in operation 302 may be associated with a geotag source such as a GPS-enabled device, a user input, a content provider, a user profile, etc.

In an operation 310, process 300 may include determining a geotag confidence level associated with the geotag data based on the geotag source identified in operation 306. For example, geotags provided by geotag sources such as a GPS-enabled device and/or user input may be more likely to be accurate than the ones provided by a user profile and/or location prediction module 113, and thus may be assigned a higher confidence level.

Figure 4:
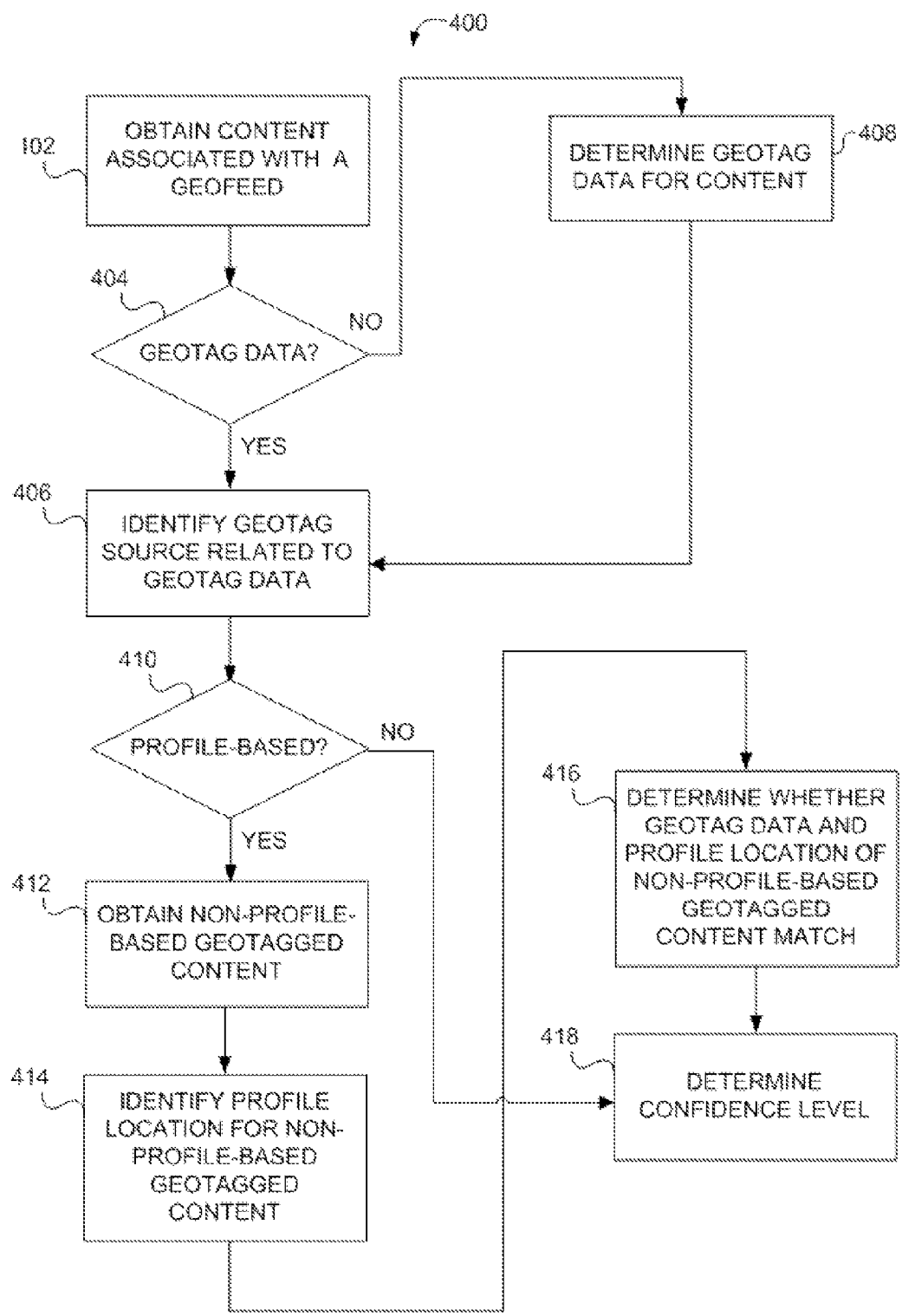
FIG. 4 illustrates a process for managing geotag data associated with content within a geofeed and determining a geotag confidence level associated with the geotag data where the geotag data has been obtained based on a user profile of a content creator who created the content, according to an aspect of the invention.

FIG. 4 illustrates a process 400 for managing geotag data associated with content within a geofeed and determining a geotag confidence level associated with the geotag data where the geotag data has been obtained based on a user profile of a content creator who created the content, according to an aspect of the invention.

In an operation 402, process 400 may include obtaining content associated with a geofeed. The geofeed may be created and/or retrieved by computer 110.

In an operation 404, process 400 may include determining whether metadata associated with the obtained content includes geotag data. If process 400 determines that the metadata associated with the content includes geotag data, process 400 may include identifying a geotag source related to the geotag data in an operation 406. On the other hand, if the metadata associated with the content does not include geotag data, process 400 may include determining geotag data for the content in an operation 408.

In operation 408, process 400 may include determining the geotag data to be associated with the content in response to determining that the metadata associated with the content does not include the geotag data. Process 400 may determine the geotag data that would most accurately describes a location where the content was created using various geotag recognition techniques including text, image, or speech recognition, context-based recognition, automated crawling of hyperlinks, automated correlation between non-geotagged content and geo-tagged content, or any combination thereof. For example, process 400 may identify a hyperlink in the content where the hyperlink points and/or links to other geotagged content whose metadata includes geotag data. Process 400 may retrieve the geotag data from the geotagged content and/or apply to the content.

In operation 406, process 400 may include identifying a source from which the geotag data originated ("geotag sources"). Geotag sources may include, for example, a GPS-enabled device (e.g., smartphone), a user input (e.g., the content creator manually inputting a geo-location when creating a social media post), a content provider (e.g., the content provider creating geotag data using various techniques as apparent to those of ordinary skill in the art), a user profile (e.g., the "home" location of the content creator), and/or location prediction module 113 (e.g., geotagged by crawling hyperlinks within content, automatic correlation, and/or other ways as discussed herein with respect to location prediction module 113). For example, the geotag data determined in operation 408 may be associated with a geotag source such as location prediction module 113 whereas the geotag data already embedded in the content obtained in operation 402 may be associated with a geotag source such as a GPS-enabled device, a user input, a content provider, a user profile, etc.

In an operation 410, process 400 may include determining whether the geotag source identified in operation 406 is a user profile. If process 400 determines that the geotag source identified in operation 406 is not a user profile, process 400 may proceed to an operation 418. On the other hand, if the geotag source identified in operation 406 is a user profile, process 400 may include obtaining from content providers a large quantity of non-profile-based geotagged content that are located within a geo-location specified in the geofeed request in an operation 412.

In an operation 414, process 400 may include identifying and/or obtaining a profile location associated with individual non-profile-based geotagged content based on the user profile of the content creator who created the particular content.

In an operation 416, process 400 may include determining whether the geotag data and the profile location of the non-profile-based geotagged content match. In doing so, the profile location may be compared to the geographical coordinates (or other geo-location information) defined in the geotag data of the individual non-profile-based geotagged content to determine whether the profile location matches with and/or correspond to the geotag data. For example, a geotag location and a profile location may match and/or correspond to each other when they are directed to a location that is common to each other (e.g., two locations having an overlapping area).

In an operation 418, process 400 may include determining a geotag confidence level associated with the geotag data of the content ("profile-based geofeed result") wherein the geotag data has been generated based on the user profile of the content creator who created the content. In doing so, process 400 may include calculating a percentage of non-profile-based geotagged content whose geotag location match with and/or correspond to its profile location in a total quantity of non-profile-based geotagged content obtained in operation 412. This percentage value may indicate a confidence level that the profile-based geofeed result actually originated from the specified geo-location. In other words, it may indicate a degree of likelihood that the profile location associated with the profile-based geofeed result accurately corresponds to the location where the content related to the profile-based geofeed result was actually created.

FIG. 5 illustrates a screenshot of an interface 500 for communicating a geofeed comprising content associated with geotag data obtained from one or more geotag sources, according to an aspect of the invention. The screenshots illustrated in FIG. 5 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 500 and other interfaces described herein may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the various interfaces of FIG. 5 and other drawing figures. Furthermore, computer 110 may receive data from the client via the various interfaces, as would be appreciated.

Referring to FIG. 5, interface 500 may include a geofeed bounded by a geo-location defined by polygon 501. The geofeed may include content items 510-515 whose locations reside within the geo-location defined by polygon 501. Individual content items 510-515 may be associated with a geotag that has been obtained from one or more geotag sources. Geotag sources may include, for example, a GPS-enabled device (e.g., smartphone), a user input (e.g., the content creator manually inputting a geo-location when creating a social media post), a content provider (e.g., the content provider creating geotag data using various techniques as apparent to those of ordinary skill in the art), a user profile (e.g., the "home" location of the content creator), and/or location prediction module 113 (e.g., geotagged by crawling hyperlinks within content, automatic correlation, and/or other ways as discussed herein with respect to location prediction module 113).

As illustrated, when content item 510 is selected (e.g., moused over, clicked, touched, or otherwise interacted with), interface 500 may cause geotag detail element 510A to appear. Geotag detail element 510A may include information related to the geotag associated with content item 510 such as, for example, a geotag source (e.g., GPS-enabled device) that provided the geotag and/or a confidence level associated with the geotag. The confidence level may indicate a likelihood (and/or probability) that the geotag accurately describes and/or matches a location from which content item 510 was created. This confidence level may also be indicative of likelihood that content item 510 associated with the particular geotag was actually created within the geo-location defined by polygon 501.

FIG. 6 illustrates a screenshot of an interface 600 for communicating a geofeed comprising content associated with geotag data that is obtained based on a user profile of a content creator who created the content, according to an aspect of the invention.

Interface 600 may include a geofeed bounded by a geo-location defined by polygon 601. The geofeed may include profile-based geofeed result 610 which has been geotagged based on a profile location included in a user profile of a content creator who created the content in profile-based geofeed result 610.

Computer 110 may determine a geotag confidence level indicative of a likelihood that the profile location associated with profile-based geofeed result 610 accurately corresponds to the location where the content related to profile-based geofeed result 610 was actually created based on a statistical analysis on a large quantity of geotagged content that has been geotagged by a geotag source other than a user profile ("non-profile-based geotagged content") (e.g., content that is geotagged with geographical coordinates) where the non-profile-based geotagged content was created within the geo-location specified for the geofeed. For example, interface 600 may include non-profile-based geotagged content items 611-613 whose geotag locations are within the geo-location defined by polygon 601.

Computer 110 may identify and/or obtain a profile location associated with individual non-profile-based geotagged content items 611-613 by accessing the user profile of the content creator who created the particular content. This profile location may be compared to the geographical coordinates (or other geo-location information) defined in the geotag of the individual non-profile-based geotagged content items 611-613 to determine whether the profile location matches or otherwise correspond to the geotag data. As illustrated, non-profile-based geotagged content item 611 may be associated with a geotag which comprises latitude and longitude coordinates of (39.098, −94.519). Computer 110 may look up a user profile of the content creator who created content item 611 to determine a profile location which may be a "home" location (e.g., Kansas City, Mo.) for the content creator. Computer 110 may compare the geographic coordinates of the geotag and the profile location to determine whether the geotag location and the profile location match and/or correspond to each other. For example, the geographic coordinates of content item 611 and content item 612 are located within the corresponding profile locations. On the other hand, the geographic coordinates of content item 613 and its profile location are spatially distant from each other and/or are not directed to a location that is common to each other. In this example, computer 110 may set the confidence level for profile-based geofeed result 610 to be 75% since 2 out of 3 non-profile-based geotagged content items are associated with geotag locations that match with and/or correspond to their associated profile locations.

FIG. 7 illustrates a screenshot of an interface 700 for communicating content within a geofeed based on geotag data confidence level selected by a user, according to an aspect of the invention.

Interface 700 may include a geofeed bounded by a geo-location defined by polygon 701. The geofeed may include content items 710-715 whose locations reside within the geo-location defined by polygon 501. Individual content items 710-715 may be associated with a geotag that has been obtained from one or more geotag sources. Geotag sources may include, for example, a GPS-enabled device (e.g., smartphone), a user input (e.g., the content creator manually inputting a geo-location when creating a social media post), a content provider (e.g., the content provider creating geotag data using various techniques as apparent to those of ordinary skill in the art), a user profile (e.g., the "home" location of the content creator), and/or location prediction module 113 (e.g., geotagged by crawling hyperlinks within content, automatic correlation, and/or other ways as discussed herein with respect to location prediction module 113). Computer 110 may determine a geotag confidence level for individual content items 710-715 based on the type of geotag source that provided the geotag for the particular content item and/or using any other techniques discussed herein.

Interface 700 may include an input field that may receive a threshold confidence level selected by a user. The input field may include a scrollbar, a text input box, and/or other input mechanisms. As illustrated, interface 700 may include scrollbar 720 having movable indicator 721 for indicating a threshold confidence level against which the geotag confidence level for individual content items 710-715 is compared.

Interface 700 may highlight or otherwise differentially display content with a confidence level that is higher than the threshold confidence level from content with a confidence level that is lower than the threshold confidence level. For example, a user may using movable indicator 721 indicate a threshold confidence level of 80%. Interface 700 may display content items 710, 712, 713 whose associated geotag confidence levels are above 80% in solid line and content items 711, 714, 715 whose associated geotag confidence levels are below 80% in dotted line. In another example, interface 700 may cause content items 711, 714, 715 to disappear since their associated geotag confidence levels are below the threshold confidence level set by the user.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for determining an accuracy of location information that indicates a location at which social media content was created, the method being implemented in a computer that includes one or more physical processors programmed by one or more computer program instructions that, when executed by the one or more physical processors, program the computer to perform the method, the method comprising:

obtaining, by the computer, a geofeed definition comprising an indication of one or more geographically definable locations;

obtaining, by the computer, social media content items based on the geofeed definition, the social media content items aggregated from a plurality of content providers based on the indication of the one or more geographically definable locations, the social media content items being provided by the plurality of content providers based on respective requests formatted specifically for individual ones of the plurality of content providers, wherein the respective requests comprise the one or more geographically definable locations, and wherein the social media content items include at least social media content from a first one of the plurality of content providers;

obtaining, by the computer, metadata associated with the social media content;

determining, by the computer, first geotag data from the metadata, the first geotag data indicating: (i) an automatically derived location, or (ii) a manually input location where the content was created;

identifying, by the computer, a geotag source related to the first geotag data, wherein the geotag source comprises a user profile of a content creator who created the social media content;

obtaining, by the computer, non-profile-based geotagged content related to the one or more geographically definable locations, wherein the non-profile-based geotagged content is associated with second geotag data generated by a geotag source other than the user profile;

identifying, by the computer, a profile location associated with the non-profile-based geotagged content based on location information defined in the user profile;

determining, by the computer, whether the second geotag data associated with the non-profile-based geotagged content and the profile location match; and determining, by the computer, a confidence level based on the determination of whether the second geotag data associated with the non-profile-based geotagged content and the profile location match, wherein the confidence level is indicative of a likelihood that the first geotag data accurately describes a location where the social media content was created.

2. The method of claim 1, wherein determining the confidence level based on the determination of whether the second geotag data associated with the non-profile-based geotagged content and the profile location match further comprises:

determining, by the computer, a percentage of the non-profile-based geotagged content whose geotag data match the profile location in the non-profile-based geotagged content.

3. A method for determining an accuracy of location information that indicates a location at which social media content was created, the method being implemented in a computer that includes one or more physical processors programmed with one or more computer program instructions that, when executed by the one or more physical processors, program the computer to perform the method, the method comprising:

obtaining, by the computer, a geofeed definition comprising an indication of one or more geographically definable locations;

obtaining, by the computer, social media content items based on the geofeed definition, the social media content items aggregated from a plurality of content providers based on the indication of the one or more geographically definable locations, the social media content items being provided by the plurality of content providers based on respective requests formatted specifically for individual ones of the plurality of content providers, wherein the respective requests comprise the one or more geographically definable locations, and wherein the social media content items include at least social media content from a first one of the plurality of content providers;

obtaining, by computer, metadata associated with the social media content;

determining, by the computer, geotag data from the metadata, the geotag data indicating: (i) an automatically derived location, or (ii) a manually input location where the social media content was created;

determining, by computer, a confidence level associated with the geotag data, wherein the confidence level is indicative of a likelihood that the geotag data accurately describes a location where the social media content was created;

receiving, by computer, a threshold confidence level; and causing, by the computer, the social media content to be displayed based on a first visual depiction responsive to a determination that the confidence level is above the threshold confidence level and causing the social media content to be displayed based on a second visual depiction responsive to a determination that the confidence level is below the threshold confidence level.

4. A system configured to determine an accuracy of location information that indicates a location at which social media content was created, the system comprising:

a computer comprising one or more physical processors programmed with one or more computer program instructions that, when executed by the one or more physical processors, program the computer to:

obtain social media content from a content provider;

obtain metadata associated with the social media content;

obtain geotag data from the metadata, the geotag data comprising location information that indicates a location at which the social media content was created;

identify a source of the geotag data;

determine a confidence level associated with the geotag data based on a type of source that provided the geotag data, wherein the confidence level is indicative of a likelihood that the geotag data accurately describes the location where the social media content was created;

obtain second social media content;

obtain second metadata associated with the second social media content;

obtain second geotag data from the second metadata, the second geotag data comprising second location information that indicates a second location at which the second social media content was created;

identify a second source of the second geotag data, wherein the source is associated with a first level of accuracy, and second source is associated with a second level of accuracy different than the first level of accuracy; and determine a second confidence level associated with the second geotag data based on the second source, wherein the second confidence level is indicative of a likelihood that the second geotag data accurately describes the second location where the second social media content was created, and wherein the second confidence level is different than the confidence level based on the difference between the first level of accuracy and the second level of accuracy.

5. The system of claim 4, wherein the source comprises a user profile of a content creator who created the social media content.

6. The system of claim 4, wherein the confidence level associated with the geotag data is further based on a predefined confidence level associated with the type of source that provided the geotag data.

7. A system configured to determine an accuracy of location information that indicates a location at which social media content was created, the system comprising:

a computer comprising one or more physical processors programmed with one or more computer program instructions that, when executed by the one or more physical processors, program the computer to:

obtain a geofeed definition comprising an indication of one or more geographically definable locations;

obtain social media content items based on the geofeed definition, the social media content items aggregated from a plurality of content providers based on the indication of the one or more geographically definable locations, the social media content items being provided by the plurality of content providers based on respective requests formatted specifically for individual ones of the plurality of content providers, wherein the respective requests comprise the one or more geographically definable locations, and wherein the social media content items include at least social media content from a first one of the plurality of content providers;

obtain metadata associated with the social media content;

determine first geotag data from the metadata, the first geotag data indicating: (i) an automatically derived location, or (ii) a manually input location where the social media content was created;

identify a geotag source related to the first geotag data, wherein the geotag source comprises a user profile of a content creator who created the social media content;

obtain non-profile-based geotagged content related to the one or more geographically definable locations, wherein the non-profile-based geotagged content is associated with second geotag data generated by a geotag source other than the user profile;

identify a profile location associated with the non-profile-based geotagged content based on location information defined in the user profile;

determine whether the second geotag data associated with the non-profile-based geotagged content and the profile location match; and determine a confidence level based on the determination of whether the second geotag data associated with the non-profile-based geotagged content and the profile location match, wherein the confidence level is indicative of a likelihood that the first geotag data accurately describes a location where the social media content was created.

8. The system of claim 7, wherein the computer is further programmed to determine a percentage of the non-profile-based geotagged content whose geotag data match the profile location in the non-profile-based geotagged content.

9. A system configured to determine an accuracy of location information that indicates a location at which social media content was created, the system comprising:

a computer comprising one or more physical processors programmed with one or more computer program instructions that, when executed by the one or more physical processors, program the computer to:

obtain a geofeed definition comprising an indication of one or more geographically definable locations;

obtain social media content items based on the geofeed definition, the social media content items aggregated from a plurality of content providers based on the indication of the one or more geographically definable locations, the social media content items being provided by the plurality of content providers based on respective requests formatted specifically for individual ones of the plurality of content providers, wherein the respective requests comprise the one or more geographically definable locations, and wherein the social media content items include at least social media content from a first one of the plurality of content providers;

obtain metadata associated with the social media content;

determine geotag data from the metadata, the geotag data indicating: (i) an automatically derived location, or (ii) a manually input location where the social media content was created;

determine a confidence level associated with the geotag data, wherein the confidence level is indicative of a likelihood that the geotag data accurately describes a location where the social media content was created;

receive a threshold confidence level; and cause the social media content to be displayed based on a first visual depiction responsive to a determination that the confidence level is above the threshold confidence level and cause the social media content be displayed based on a second visual depiction responsive to a determination that the confidence level is below the threshold confidence level.

10. A computer implemented method of determining a location at which social media content was created, wherein the social media content was created at the location and posted to a social media content provider, the method being implemented on a computer having one or more physical processors programmed with one or more computer program instructions that, when executed by the one or more physical processors, program the computer to perform the method, the method comprising:

obtaining, by the computer, social media content from the social media content provider, wherein the social media content is associated with a user;

obtaining, by the computer, metadata associated with the social media content;

determining, by the computer, whether geotag data, which indicates: (i) an automatically derived location, or (ii) a manually input location where the content was created, is missing from the metadata; and identifying, by the computer, a location from which the social media content was created responsive to a determination that the geotag data is missing from the metadata, wherein identifying the location comprises:

obtaining, by the computer, a second social media content associated with the user;

obtaining, by the computer, second metadata associated with the second social media content;

obtaining, by the computer, second geotag data from the second metadata, the second geotag data comprising location information that indicates a location at which the second social media content was created;

obtaining, by the computer, a difference between a first time at which the social media content was posted and a second time at which the second social media content was posted; and determining, by the computer, whether the difference is less than or equal to a predetermined time, wherein the location is determined based on the location in which the second social media content was created responsive to a determination that the difference is less than or equal to the predetermined time.

11. The method of claim 10, wherein identifying the location further comprises:

recognizing, by the computer, text from the social media content; and associating, by the computer, the recognized text with a recognized location, wherein the location is determined based on the recognized location.

12. The method of claim 10, the method further comprising:
   identifying, by the computer, a hyperlink in the social media content, wherein the hyperlink links to geotagged content whose metadata includes second location information that indicates where the geotagged content was created, wherein the location is based on the second location information.

13. The method of claim 12, the method further comprising:
   identifying, by the computer, a correlation between the social media content and the geotagged content, wherein the location is based on the correlation.

14. The method of claim 10, wherein identifying the location further comprises:
   recognizing, by the computer, an image from the social media content; and
   associating, by the computer, the recognized image with a recognized location, wherein the location is determined based on the recognized location.

15. A method for determining an accuracy of location information that indicates a location at which social media content was created, the method being implemented on a computer that includes one or more physical processors programmed by one or more computer program instructions that, when executed by the one or more physical processors, program the computer to perform the method, the method comprising:
   obtaining, by the computer, social media content from a content provider;
   obtaining, by the computer, metadata associated with the social media content;
   obtaining, by the computer, geotag data from the metadata, the geotag data comprising location information that indicates a location at which the social media content was created;
   identifying, by the computer, a source of the geotag data;
   determining, by the computer, a confidence level associated with the geotag data based on a type of source that provided the geotag data, wherein the confidence level is indicative of a likelihood that the geotag data accurately describes the location where the social media content was created;
   obtaining, by the computer, second social media content;
   obtaining, by the computer, second metadata associated with the second social media content;
   obtaining, by the computer, second geotag data from the second metadata, the second geotag data comprising second location information that indicates a second location at which the second social media content was created;
   identifying, by the computer, a second source of the second geotag data, wherein the source is associated with a first level of accuracy, and second source is associated with a second level of accuracy different than the first level of accuracy; and
   determining, by the computer, a second confidence level associated with the second geotag data based on the second source, wherein the second confidence level is indicative of a likelihood that the second geotag data accurately describes the second location where the second social media content was created, and wherein the second confidence level is different than the confidence level based on the difference between the first level of accuracy and the second level of accuracy.

16. The method of claim 15, wherein the source of the geotag data comprises a GPS-enabled device, a user input, the content provider, and/or a user profile of a content creator who created the social media content.

17. The method of claim 15, wherein the confidence level associated with the geotag data is further based on a predefined confidence level associated with the type of source from which the geotag data was derived.

* * * * *

UNITED STATES PATENT AND TRADEMARK OFFICE
CERTIFICATE OF CORRECTION

PATENT NO. : 9,436,690 B2
APPLICATION NO. : 14/512293
DATED : September 6, 2016
INVENTOR(S) : Philip B. Harris et al.

It is certified that error appears in the above-identified patent and that said Letters Patent is hereby corrected as shown below:

On the title page, Item (73) Assignee, please change

"Geofeedia, Inc., Naples (FR)"

to

--Geofeedia, Inc., Naples, FL (US)--.

Signed and Sealed this
Fifteenth Day of November, 2016

Michelle K. Lee
*Director of the United States Patent and Trademark Office*